United States Patent [19]

Filion et al.

[11] Patent Number: 5,539,259

[45] Date of Patent: * Jul. 23, 1996

[54] HORN ACTUATOR INCORPORATING A TRANSDUCER IN A STEERING WHEEL

[75] Inventors: Scott M. Filion, Newmarket; Colin C. Frost, Dover; Denis L. Moore, Rollinsford; Richard D. Roberge, Somersworth; Vincent J. Yedlin, Manchester, all of N.H.

[73] Assignee: Davidson Textron, Inc., Dover, N.H.

[ * ] Notice: The portion of the term of this patent subsequent to Apr. 29, 2012, has been disclaimed.

[21] Appl. No.: 476,596

[22] Filed: Jun. 7, 1995

Related U.S. Application Data

[63] Continuation of Ser. No. 5,314, Jan. 15, 1993, Pat. No. 5,463,258, which is a continuation-in-part of Ser. No. 875,390, Apr. 29, 1992, Pat. No. 5,269,599.

[51] Int. Cl.⁶ .................................................. B60R 21/16
[52] U.S. Cl. .................. 307/10.1; 200/61.54; 280/728.3
[58] Field of Search .................................... 307/10.1, 9.1, 307/116, 119; 361/170, 179; 200/61.54–61.56, 511–517; 340/384.7; 280/731, 735, 728.1, 728.2, 728.3, 736, 743.1

[56] References Cited

U.S. PATENT DOCUMENTS

| 3,574,414 | 4/1971 | Jacob | 303/7 |
|---|---|---|---|
| 3,670,174 | 6/1972 | Sakakibara | 307/10.1 |
| 3,819,205 | 6/1974 | Dunford et al. | 280/731 |
| 3,943,507 | 3/1976 | Neal et al. | 340/384.7 |
| 4,308,439 | 12/1981 | Itoh | 200/511 |
| 4,325,568 | 4/1982 | Clark et al. | 280/731 |
| 4,332,989 | 6/1982 | Nicolaisen | 200/47 |
| 4,347,505 | 8/1982 | Anderson | 340/666 |
| 4,575,117 | 3/1986 | Uchida | 280/750 |
| 4,612,425 | 9/1986 | Kanai et al. | 200/66.55 |
| 4,638,131 | 1/1987 | Kidd et al. | 200/61.55 |
| 4,714,806 | 12/1987 | Inui et al. | 200/61.55 |
| 4,871,991 | 10/1989 | Noda et al. | 340/384.7 |
| 4,934,735 | 6/1990 | Embach | 280/731 |
| 5,002,306 | 3/1991 | Hiramitsu et al. | 280/731 |
| 5,062,661 | 11/1991 | Winget | 280/731 |
| 5,198,629 | 3/1993 | Hayashi et al. | 200/61.54 |
| 5,212,473 | 5/1993 | Louis | 340/711 |
| 5,232,243 | 8/1993 | Blackburn et al. | 280/735 |
| 5,269,559 | 12/1993 | Filion et al. | 200/61.54 |
| 5,303,952 | 4/1994 | Shermetaro et al. | 280/731 |
| 5,344,185 | 9/1994 | Cooke, II | 200/61.54 |
| 5,398,962 | 3/1995 | Kropp | 200/61.54 |
| 5,399,819 | 3/1995 | Lang et al. | 200/61.54 |
| 5,423,569 | 6/1995 | Reighard et al. | 200/61.54 |
| 5,449,197 | 9/1995 | Kerner | 280/728.3 |
| 5,463,258 | 10/1995 | Filion et al. | 307/10.1 |

FOREIGN PATENT DOCUMENTS

| 4016047 | 5/1990 | Germany . |
|---|---|---|
| 1301461 | 12/1989 | Japan . |

*Primary Examiner*—William M. Shoop, Jr.
*Assistant Examiner*—Richard T. Elms
*Attorney, Agent, or Firm*—Reising, Ethington, Barnard and Perry

[57] ABSTRACT

A steering wheel (12) incorporates an air bag unit (22). The air bag unit has a cover door (30) with a transducer (38) molded in a deformable front wall (35) of the cover door. The transducer can be a force sensitive resistor (38) which is operably connected to an electrical circuit (42) that actuates a horn (44) when the circuit senses a change in the resistance of force sensitive resistor (38). The force sensitive resistor (38) produces a suitable change in resistance when hand pressure is exerted on the front wall (35).

10 Claims, 4 Drawing Sheets

HORN ACTUATOR INCORPORATING A TRANSDUCER IN A STEERING WHEEL

CROSS-REFERENCE TO RELATED APPLICATION

This is a continuation of application Ser. No. 08/005,314, filed on Jan. 15, 1993, now U.S. Pat. No. 5,463,258, which is a continuation-in-part of Ser. No. 07/875,390, filed Apr. 29, 1992, now U.S. Pat. No. 5,269,599.

TECHNICAL FIELD

This invention relates to automobile horn actuator circuits in general and, in particular, relates to a horn actuator circuit which includes a transducer attached to an air bag cover door.

BACKGROUND OF THE INVENTION

Steering wheels, because of their convenient location, typically include switches that actuate various motor vehicle accessories. Automobile horn switches are the most common of these. Traditionally, these horn switches have been relatively large buttons centrally located at the hub of the steering wheel. Their large size simplifies the operator's task of quickly locating and depressing the switch. See, for example, U.S. Pat. Nos. 4,575,117, issued Mar. 11, 1986 to S. Uchida, 4,612,425, issued Sep. 16, 1986 to M. Kanai et al., 4,638,131, issued Jan. 20, 1987 to R. L. Kidd et al., and 4,714,806, issued Dec. 22, 1987 to S. Inui et al.

Steering wheels are also the most convenient location for mounting a driver's side air bag. The air bag is often mounted at the hub of the steering wheel. However, the incorporation of an air bag unit within the steering wheel has made the inclusion of horn or other actuating switches within the steering wheel more complicated. Firstly, the air bag unit with its casing and cover door occupy a significant portion of the area within the steering wheel rim. Secondly, the cover door must be free to open upon expansion of the air bag.

Consequently, the horn switch has typically been relocated away from the hub and downsized to fit within the remaining space within the rim about the air bag cover door. See, for example, U.S. Pat. Nos.: 3,819,205, issued Jun. 25, 1974 to S. G. Dunford et al., and 4,325,568, issued Apr. 20, 1982 to H. D. Clark et al. However, due to the historically conventional practice of locating a horn switch at the hub of a steering wheel, most drivers still feel more comfortable with a horn switch at the hub, particularly when faced with a panic situation. The conspicuous presence of a large pad at the hub further confuses drivers into mistakenly believing that the pad is the horn button.

Various arrangements have been disclosed for providing membrane switches incorporated into air bag cover doors to thereby return the location of the horn switch to the hub. See, for example, U.S. Pat. Nos. 4,934,735, issued Jun. 19, 1990 to J. T. Embach; 5,002,306, issued Mar. 26, 1991 to T. Hiramitsu et al.; and 5,062,661, issued Nov. 5, 1991 to L. J. Winget. These membrane switches are composite structures which typically include a flexible member covered by a conductive surface which is separated by a spacer from another conductive surface. The multiple components used in these switches (i.e., the first and second conductive surfaces, flexible membrane, and spacers) increase the complexity of manufacturing the air bag cover door.

SUMMARY OF THE INVENTION

The aforementioned shortcomings of prior art air bag cover door/horn actuator arrangements is provided by an air bag cover door to which is attached a force sensitive resistor having a resistance that changes upon pressure being exerted on the cover door, and a switching circuit responsive to a change in the resistance of the force sensitive resistor to thereby actuate an electrical device. The invention may be used to actuate any electrical device. For example, it can be used to activate an automobile horn or a horn relay which closes its contacts to provide power to the automobile horn.

Preferably, the switching circuit comprises a solid state switch such as a transistor which is responsive to a large change in resistance of the force sensitive resistor to thereby change from a high impedance state to a low impedance state.

In the broader aspects of the invention, the force sensitive resistor is attached to any deformable front wall section of an automobile steering wheel and is sensitive to pressure placed upon the deformable surface of the front wall section to produce a change in its resistance.

The switching circuit can be located remotely from the air bag assembly and need not even be located at the steering wheel or steering column.

BRIEF DESCRIPTION OF THE DRAWINGS

Reference now is made to the accompanying drawings in which.

DETAILED DESCRIPTION OF THE PREFERRED EMBODIMENTS

Figure 1:
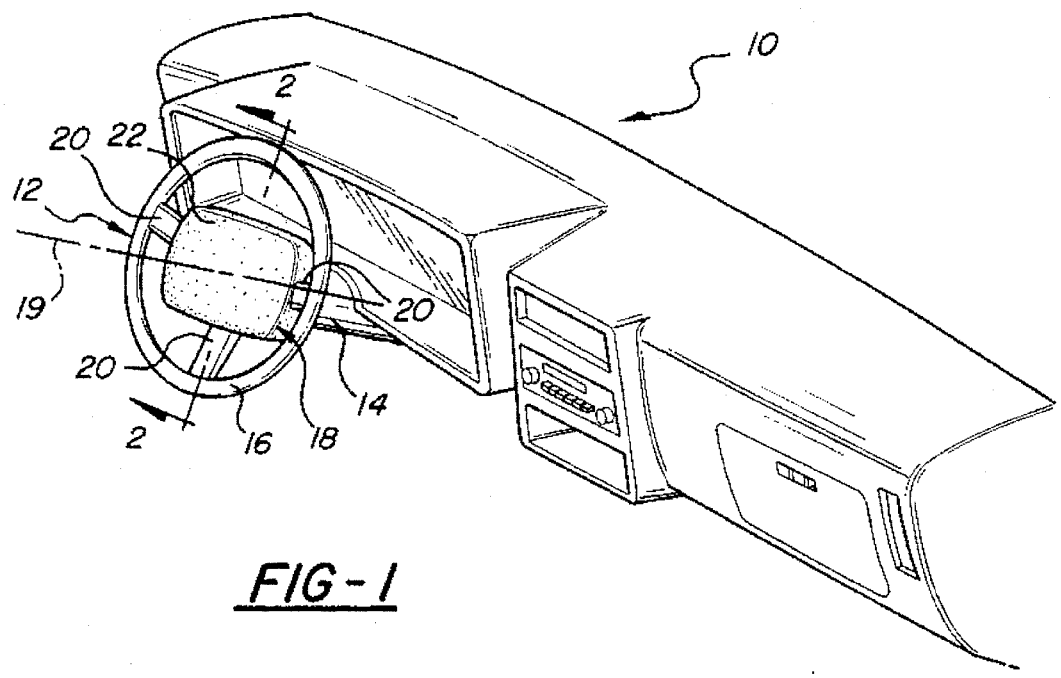
FIG. 1 is a perspective view of a motor vehicle dashboard and a steering wheel incorporating the present invention.
Figure 2:
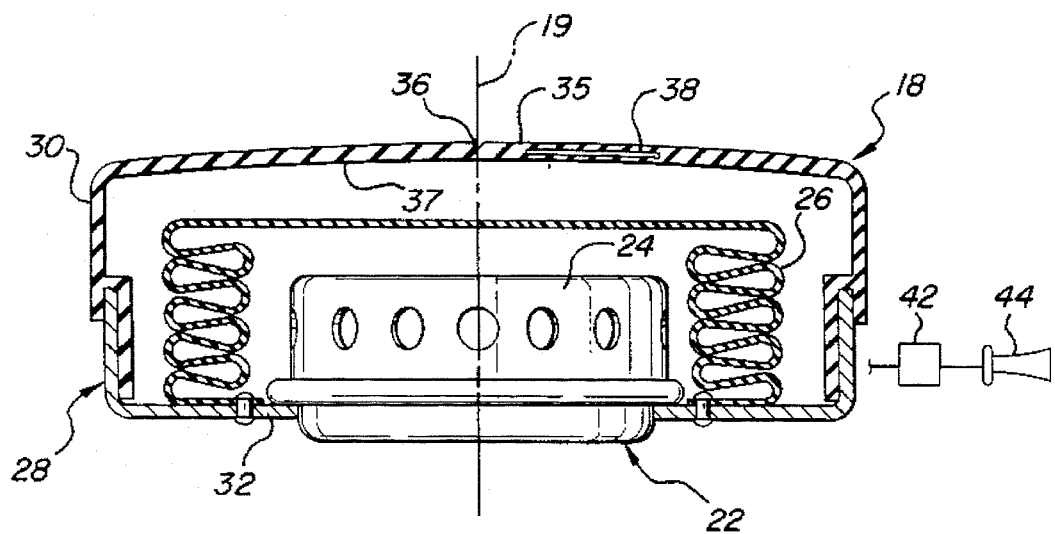
FIG. 2 is a partially schematic and cross-sectional view taken along lines 2—2 shown in FIG. 1.

As shown in FIG. 1, a motor vehicle dashboard 10 has a steering wheel 12 mounted at the upper end of a steering column 14. The steering wheel 12 has a rim 16 attached to a hub section 18 via a plurality of spokes 20. The hub 18 is mounted at the central axis 19 of the steering column 14. As shown in FIG. 2, the hub section 18 incorporates an air bag unit 22 with a gas generator 24 and an air bag 26 operably connected about the gas generator to receive any gas emanating from the generator. The gas generator 24 and air bag 26 are mounted inside a casing 28. The casing 28 includes a bottom half 32 and a cover door 30 that is mounted to the bottom half 32 and is normally closed to conceal the casing bottom half 32, gas generator 24 and air bag 26.

The cover door 30 is molded from semi-flexible TPE, TPO or similar plastic material. The door 30 includes a deformable front wall section 35 that has a conventional tear seam 36 which allows the door 30 to open upon deployment of the air bag 26.

The door 30 also includes a force sensitive variable resistor 38 molded therein. A suitable variable resistor is available from Interlink Electronics under the brand name FSR. Other thin film strain gauges are also suitable to function as a variable resistor.

Figure 3:
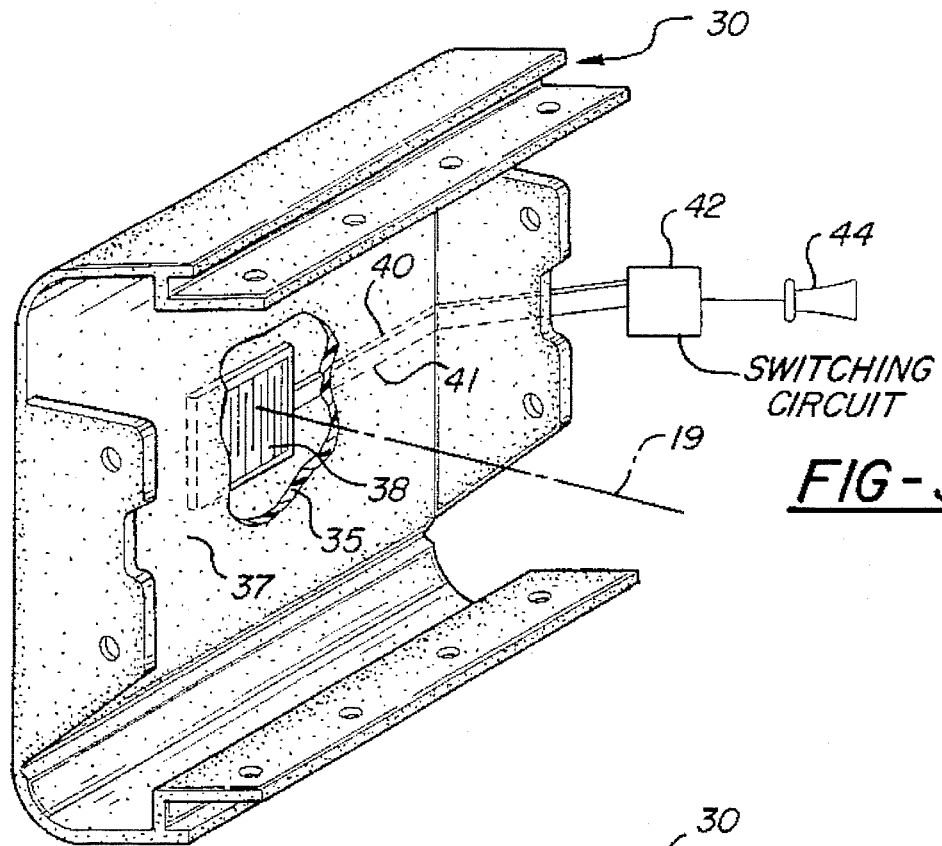
FIG. 3 is a rear perspective and partially segmented view of a cover door with the molded-in force sensitive resistor shown.

Referring now also to FIG. 3, suitable input lead 40 and output lead 41 extend from the resistor 38 to the exterior of the cover door 30 and are operably connected to a switching circuit 42 which is in turn operably connected to a horn 44. Switching circuit 42 is constructed to actuate horn 44 upon sensing an appropriate change in the resistance of variable resistor 38.

In operation, an operator merely presses the deformable front wall section 35 when the horn is desired. The pressing of the front wall 35 deforms the wall 35 inwardly and also stress and deforms force sensitive variable resistor 38 molded therein. The variable resistor reacts to this stress by changing its electrical resistance. Force sensitive resistor 38, which produced a first non-actuating resistance before being deformed by the operator, now produces a second actuating resistance which is sensed by switching circuit 42 which then actuates horn 44.

Figure 4:
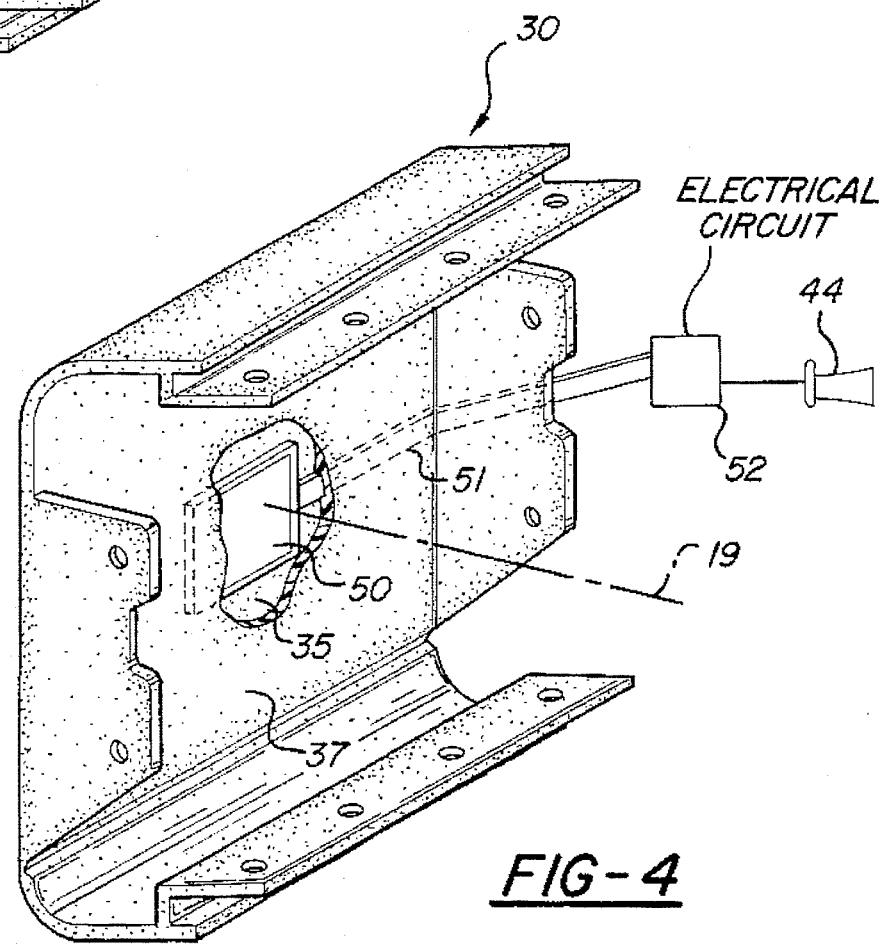
FIG. 4 is a view similar to FIG. 3 illustrating a piezo-electrical device molded therein.

Referring now to FIG. 4, a thin film piezoelectrical device 50 is substituted for the variable resistor. The piezoelectrical device 50 produces a voltage when a mechanical stress or pressure is exerted thereon. Its output lead 51 is operably connected to an electrical circuit 52 that is connected to horn 44. The electrical circuit 52 senses the produced voltage by the stressed piezoelectrical device to actuate the horn 44.

Figure 5:
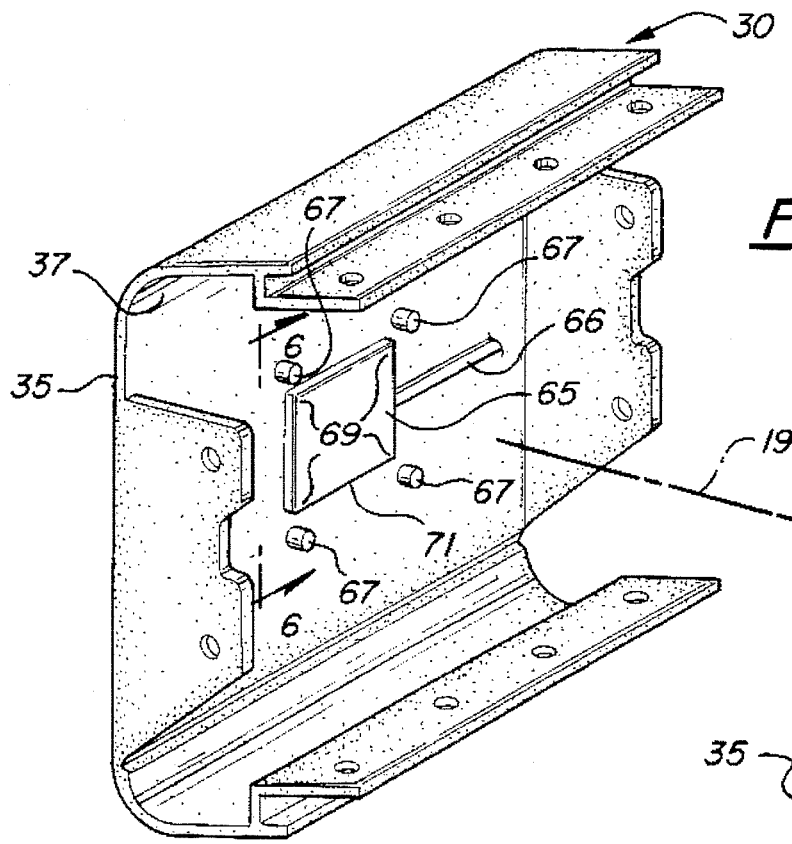
FIG. 5 is a front perspective view illustrating another embodiment.
Figure 6:
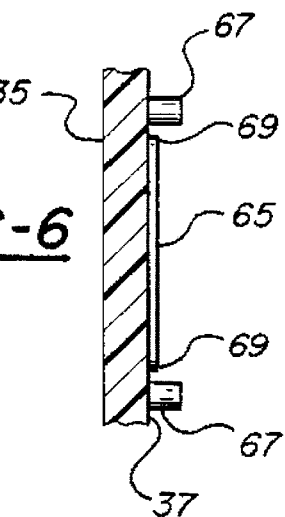
FIG. 6 is a cross-sectional view taken along lines 6—6 shown in FIG. 5.

Both the variable resistor 38 and piezoelectrical device 50 can be positioned at the central axis 19 of the hub 18. Furthermore, instead of being molded into the front wall section 35, they both may be adhered to the inside surface 37 of the wall section 35. As shown in FIGS. 5 and 6, a thin film transducer member 65, is adhered to inside surface 37. The adhesive used to bond the member 65 to surface 37 may be a urethane moisture cured base or a pressure sensitive adhesive. Standoff protrusions 67 extend rearwardly from the inside surface 37 to protect and space the member 65 from any direct contact with parked material of the air bag 26. The protrusions may extend about 3/16 inch for a member 65 having 1½ inch sides. The protrusions 67 are preferably located near the corners 69 of the member 65. Other locations such as near the middle of each edge 71 are also suitable. The protrusions can be integrally molded with the front wall section 35. The protrusion can be any cross-sectional shape and may be ridgelike and circumscribe member 65. The member 65 has its output lead 66 operably connected an electrical circuit (not shown). The member 65, similar to transducers 38 or 50, is sensitive to hand pressure applied to the front wall section 35.

Figure 7:
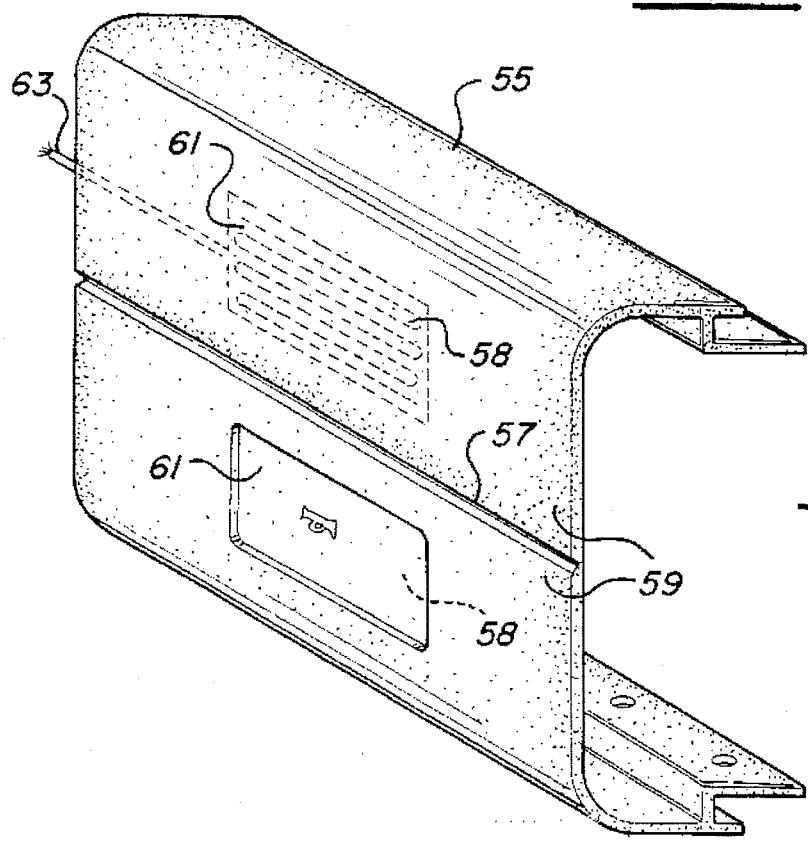
FIG. 7 is a front perspective view illustrating another embodiment in accordance with the invention.

Referring now to FIG. 7, a door cover 55 has a central tear seam 57 with two transducers 58 embedded in a deformable front wall section 59 about each side of the seam 57. The front wall may have sections 61 that can be embossments or recesses or other indication to designate the location of the transducers. The transducers, either a variable resistor or piezoelectrical device, are thin film devices that react to pressure exerted on the sections 61. Each transducer 58 has its output lead 63 operably connected to an electrical circuit (not shown).

Figure 8:
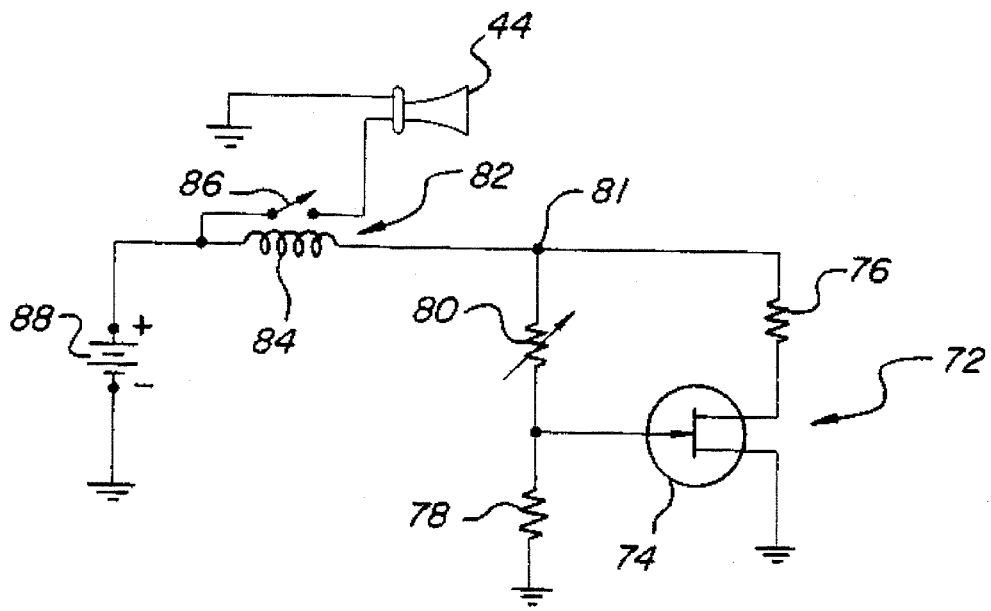
FIG. 8 is a schematic drawing of one embodiment of a horn actuating circuit.

FIG. 8 shows a schematic representation of a circuit 72 which may suitably be employed as switching circuit 42 of FIGS. 2 and 3. Circuit 72 includes a field effect transistor (FET) 74 and a pair of resistors 76, 78. Circuit 72 is connected to a force sensitive resistor 80, which, as previously discussed in connection with the transducers shown on FIGS. 1–7, is embedded within or mounted upon a front wall section of a steering wheel mounted air bag cover door. As described in more detail below, a suitable change in the resistance of force sensitive resistor 80 turns on transistor 74 to thereby actuate horn 44.

One terminal of force sensitive resistor 80 is connected to one end of resistor 76 to form a node 81. The other terminal of force sensitive resistor 80 is connected to the gate of transistor 74. The other end of resistor 76 is connected to the drain of transistor 74. Resistor 78 is connected between the gate of transistor 74 and a common ground. The source of transistor 74 is connected to ground. Node 81 is connected to a horn actuating relay 82 which includes a coil 84 and a relay contact 86. Specifically, node 81 is connected to one end of coil 84. The other end of coil 84 is connected to one end of relay contact 86 and to the positive terminal of an automobile battery 88. The negative terminal of battery 88 is connected to ground. The other end of relay contact 86 is connected to a first input to horn 44. The other input to horn 44 is connected to ground.

Force sensitive resistor 80 has a very high resistance (e.g., greater than 1 Megohm) when no pressure is being exerted thereon. Resistor 78 is selected to have a value low enough such that the voltage developed at the gate of transistor 74 will be below the threshold voltage of transistor 74 so that transistor 74 is normally not conducting. When pressure is exerted on force sensitive resistor 80, its resistance falls, allowing more current to flow through resistor 78, thereby increasing the voltage at the gate of transistor 74. The value of resistor 78 is selected such that the gate voltage of transistor 74 exceeds the threshold voltage upon suitable hand pressure being exerted upon the front wall section on which force sensitive resistor 80 is mounted. Once the threshold voltage of transistor 74 is exceeded, transistor 74 begins conducting thereby causing current to flow through coil 84 of relay 82. This in turn causes contacts 86 to close, thereby actuating horn 44. Resistor 76 is a low resistance resistor selected to permit sufficient voltage to be maintained at the gate of transistor 74 when transistor 74 begins conducting.

Although transistor 74 is shown as a junction field effect transistor, it will be understood by those skilled in the art that an insulated gate field effect transistor could also suitably be employed. Preferably, transistor 74 is of the type having an intrinsic diode connected between the source and drain which protects transistor 74 from reverse voltage as in the case where, for example, battery 88 is connected backwards.

Figure 9:
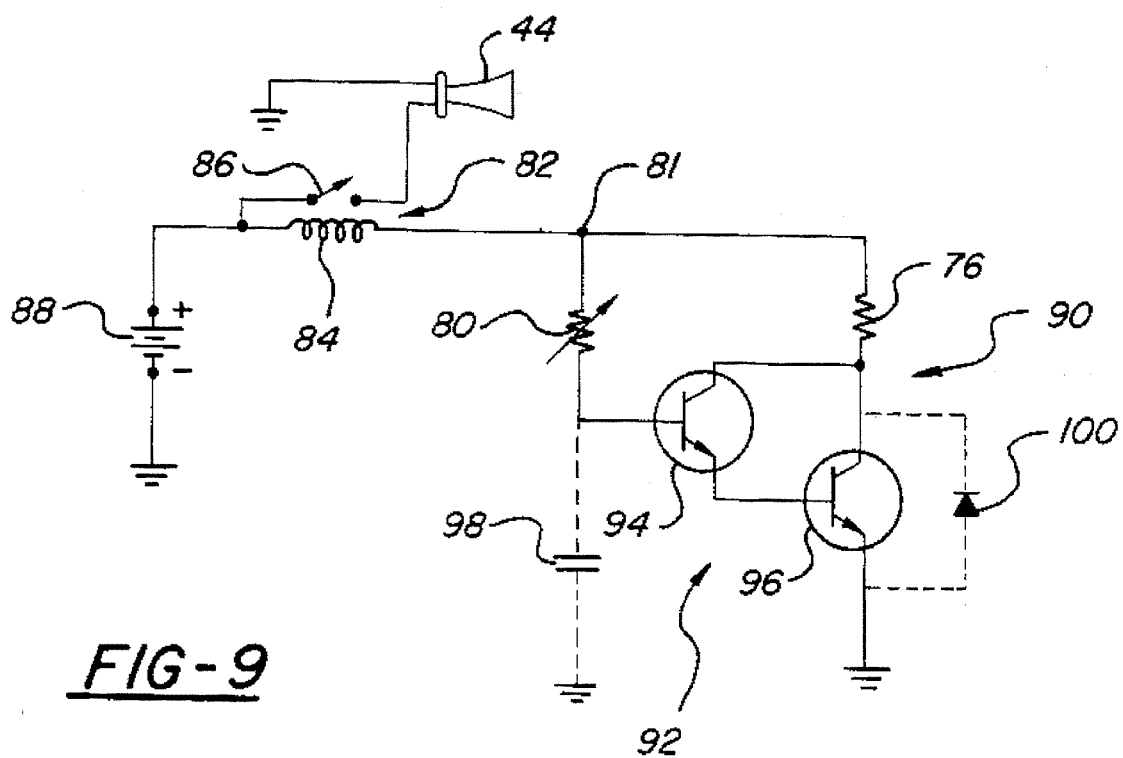
FIG. 9 is a schematic drawing of an alternative embodiment of a horn actuating circuit.

FIG. 9 depicts a schematic representation of another circuit 90 which can suitably be used for switching circuit 42 of FIGS. 2 and 3. Circuit 90 is the same as circuit 72 of FIG. 8 except that resistor 78 is eliminated and a Darlington transistor pair 92 is used in place of transistor 74. Resistor 78 is not needed in circuit 90 because transistor pair 92 utilizes bipolar junction transistors which are activated by current flowing into their base and, therefore, need no biasing resistor. Transistor pair 92 includes a transistor 94 connected to a transistor 96 in a typical Darlington fashion. Darlington transistor pair 92 provides a high gain, thereby providing activation of horn 44 using only a small current flow through force sensitive resistor 80. Of course it will be understood that by proper selection of force sensitive resistor 80, transistor 94 could be eliminated by connecting the base of transistor 96 directly to the lower end of force sensitive resistor 80.

Other such variations will be apparent to those skilled in the art. For instance, resistor 76 of circuits 72 and 90 could be eliminated by connecting the upper end of force sensitive resistor 80 directly to a source of constant voltage, such as the positive terminal of battery 88. Additionally, horn 44 could be directly connected between the positive terminal of battery 88 and circuit 72 (or 90) thereby eliminating relay 82.

Preferably, circuit 90 includes a filter capacitor 98 connected between the base of transistor 94 and ground to eliminate high frequency noise. Circuit 90 also preferably includes a diode 100 having its anode connected to ground and its cathode connected to the collector of transistor 96 to protect transistor 96 from reverse voltages.

It will thus be apparent that there has been provided in accordance with the present invention an air bag cover door incorporating a transducer and a switching circuit responsive to the transducer which achieves the aims and advantages specified herein. It will, of course, be understood that the foregoing description is a preferred exemplary embodiment of the invention and that the invention is not limited to the specific embodiments shown. Various changes and modifications will become apparent to those skilled in the art and all such variations and modifications are intended to come within the spirit and scope of the appended claims.

We claim:

1. An apparatus for actuating an electrical device in response to pressure applied to an air bag cover door of a steering wheel mounted air bag unit, the air bag unit being of the type having a gas generator within a casing and an air bag operably fixed to said casing for receiving gas from said gas generator, said apparatus comprising:

said air bag cover door having a front wall section that includes an inside surface and is deformable upon hand pressure being exerted thereon; and a transducer mounted to said front wall section, said transducer normally producing a first non-actuating characteristic and being subject to the same deformation forces as said front wall section due to hand pressure and being sensitive to the deformation forces to produce a second actuating characteristic;

said transducer operably connectable to an electrical circuit that is connected to a vehicle horn, said horn actuated by said circuit upon said transducer producing said second actuating characteristic; and said cover door formed as a single layer wall of flexible plastic material having said transducer adhesively bonded to said inside surface of said cover door.

2. An apparatus for actuating an electrical device in response to pressure applied to an air bag cover door of a steering wheel mounted air bag unit, the air bag unit being of the type having a gas generator within a casing and an air bag operably fixed to said casing for receiving gas from said gas generator, said apparatus comprising:

said air bag cover door having a front wall section that includes an inside surface and is deformable upon hand pressure being exerted thereon; and a transducer molded integrally within said front wall section, said transducer normally producing a first non-actuating characteristic and being subject no the same deformation forces as said front wall section due to hand pressure and being sensitive to the deformation forces to produce a second actuating characteristic;

said transducer operably connectable to an electrical circuit that is connected to a vehicle horn, said horn actuated by said circuit upon said transducer producing said second actuating characteristic; and said cover door formed as a single layer wall of flexible plastic material.

3. An apparatus for actuating an electrical device in response to pressure applied to a deformable cover door for an air bag unit, comprising:

an air bag cover door having a front wall section that includes an inside surface adapted to contain an air bag within the air bag unit, said front wall section constructed such that said inside surface is deformable upon hand pressure being exerted on said front wall section;

a transducer mounted to said front wall section and being constructed to undergo substantially the same deformation as the portion of said inside surface that is coextensive with said transducer, said transducer exhibiting a detectable characteristic in the absence of hand pressure being exerted on said front wall section and said transducer responsive to the deformation to provide a measurable change in said characteristic; and a switching circuit connected to said transducer, said switching circuit operable to change its conductive state in response to the measurable change in said characteristic.

4. An apparatus as defined in claim 3, further comprising a protrusion located proximate said transducer and extending rearwardly from said inside surface past said transducer to thereby space the air bag located from said transducer.

5. An apparatus as defined in claim 4, wherein said protrusion is one of a plurality of protrusions unitary with said front cover section and located on said inside surface such that they are spaced about said transducer.

6. An apparatus as defined in claim 3, wherein said transducer is a force sensitive resistor, whereby said characteristic is resistance.

7. An apparatus as defined in claim 6, wherein said force sensitive resistor is adhered to said inside surface by a pressure sensitive adhesive.

8. An apparatus as defined in claim 3, wherein said transducer comprises a force sensitive resistor and said switching circuit comprises transistor switch having a first current carrying terminal for coupling said transistor switch to the electrical device, a second current carrying terminal coupled to a common ground, and a driving terminal coupled to said force sensitive resistor; and wherein said transistor switch is operable to provide a low impedance path from said first current carrying terminal to said second current carrying terminal when said force sensitive resistor undergoes a change in resistance value.

9. An apparatus as defined in claim 8, wherein said switching circuit further comprises a resistive element having a first terminal coupled to said first current carrying terminal of said transistor switch and a second terminal for coupling said transistor switch to the electrical device.

10. An apparatus as defined in claim 8, wherein said force sensitive resistor is adhered to said inside surface by a pressure sensitive adhesive.

* * * * *